United States Patent
Min

(10) Patent No.: US 8,751,684 B2
(45) Date of Patent: Jun. 10, 2014

(54) IMAGE FORMING METHOD, IMAGE FORMING APPARATUS, AND HOST

(75) Inventor: Ju-won Min, Suwon-si (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 477 days.

(21) Appl. No.: 12/053,784

(22) Filed: Mar. 24, 2008

(65) Prior Publication Data

US 2009/0031039 A1 Jan. 29, 2009

(30) Foreign Application Priority Data

Jul. 23, 2007 (KR) .................. 10-2007-0073686

(51) Int. Cl.
*G06F 15/173* (2006.01)

(52) U.S. Cl.
USPC ........................ 709/239; 709/224; 709/228

(58) Field of Classification Search
USPC .............. 709/238, 223, 224, 227, 228, 239
See application file for complete search history.

(56) References Cited

U.S. PATENT DOCUMENTS

| | | | |
|---|---|---|---|
| 5,774,640 A * | 6/1998 | Kurio | 714/4.3 |
| 6,549,947 B1 * | 4/2003 | Suzuki | 709/229 |
| 6,906,814 B1 * | 6/2005 | Aonuma et al. | 358/1.15 |
| 7,286,049 B2 * | 10/2007 | Martin | 340/507 |
| 7,382,477 B2 * | 6/2008 | Wanda | 358/1.15 |
| 2004/0165525 A1 | 8/2004 | Burak | |
| 2006/0274647 A1 * | 12/2006 | Wang et al. | 370/216 |
| 2007/0110017 A1 * | 5/2007 | Fulknier et al. | 370/338 |
| 2011/0153815 A1 * | 6/2011 | Aoki | 709/224 |

FOREIGN PATENT DOCUMENTS

| | | |
|---|---|---|
| JP | 2000-59559 | 2/2000 |
| JP | 2006-148558 | 6/2006 |

OTHER PUBLICATIONS

Korean Office Action dated Sep. 30, 2011 issued in KR Application No. 10-2007-0073686.

\* cited by examiner

*Primary Examiner* — Viet Vu
*Assistant Examiner* — Keyvan Emdadi
(74) *Attorney, Agent, or Firm* — Stanzione & Kim, LLP

(57) ABSTRACT

An image forming method, an image forming apparatus, and a host include determining if a disorder is generated in a network set to perform an operation among networks between an image forming apparatus including at least two network interfaces and a host, and if a disorder is generated in the set network, networking the image forming apparatus with the host via a non-disordered network interface.

22 Claims, 3 Drawing Sheets

IMAGE FORMING METHOD, IMAGE FORMING APPARATUS, AND HOST

CROSS-REFERENCE TO RELATED APPLICATIONS

This application claims priority under 35 U.S.C. §119(a) from Korean Patent Application No. 10-2007-0073686, filed on Jul. 23, 2007, in the Korean Intellectual Property Office, the disclosure of which is incorporated herein in its entirety by reference.

BACKGROUND OF THE INVENTION

1. Field of the Invention

The present general inventive concept relates to an image forming apparatus, such as printers, multi-functional peripherals, etc., and more particularly, to technology to perform a printing operation when a communications disorder is generated, by using a network interface not affected by the communications disorders.

2. Description of the Related Art

A conventional image forming apparatus, such as a printer, that forms a network with other devices, performs printing when a single IP address is allocated to a single network interface or a single network card included in the image forming apparatus.

In order to achieve network printing, an IP address is set to a network interface of a network image forming apparatus, and a network port is installed in a user PC, so that the IP address of the network image forming apparatus is set. Thereafter, print data is transmitted and printed via the IP address of the network image forming apparatus.

However, when a disorder occurs in the network during transmission of the print data, an ongoing printing operation is stopped. Therefore, the ongoing printing operation cannot be performed until the network disorder is manually removed.

SUMMARY OF THE INVENTION

The present general inventive concept provides an image forming method, an image forming apparatus, and a host, by which when a communication disorder is generated in a network of an image forming apparatus having a plurality of network interfaces, operation data is transmitted via a network interface not affected by the communication disorder so that an ongoing operation can continue without interruptions.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a network image forming method including determining if a disorder is generated in a network set to perform an operation among networks between an image forming apparatus including at least two network interfaces and a host, and if a disorder is generated in the set network, networking the image forming apparatus with the host via a non-disordered network interface.

The foregoing and/or other aspects and utilities of the present general inventive concept may also be achieved by providing an image forming apparatus including a plurality of network interfaces networked with a host, a disorder generation determining unit to determine if a disorder is generated in a network interface set to perform an operation among the network interfaces, and a control unit to control the image forming apparatus to be networked with the host via a non-disordered network interface according to a result of the determination performed by the disorder generation determining unit.

The foregoing and/or other aspects and utilities of the present general inventive concept may also be achieved by providing an image forming system to perform an image forming operation, including at least two network interfaces, and a control unit to form a network between the image forming apparatus and the host using one of the at least two network interfaces, and to form another network between the image forming apparatus and the host using another one of the at least two network interfaces according to a disorder of the one of the at least two network interfaces.

The foregoing and/or other aspects and utilities of the present general inventive concept may also be achieved by providing an image forming system including an image forming apparatus including at least two network interfaces connectable to a host to perform an image forming operation, and to selectively use one of the at least two network interfaces when another one of the two network interfaces has a disorder in communicating with the host.

The foregoing and/or other aspects and utilities of the present general inventive concept may also be achieved by providing an image forming system including an image forming apparatus including at least two network interfaces, to form a network with an external device using one of the at least two network interfaces, and to form another network with the external device using another one of the at least two network interfaces when the one of the at least two network interfaces is in disorder to complete an image forming operation.

The foregoing and/or other aspects and utilities of the present general inventive concept may also be achieved by providing an image forming system including a host connectable to an image forming apparatus, to form a network with the image forming apparatus according to information on one of at least two network interfaces of the image forming apparatus, and to form another network using information on another one of the at least two network interfaces to form another network according to a disorder of the one of the at least two network interfaces.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
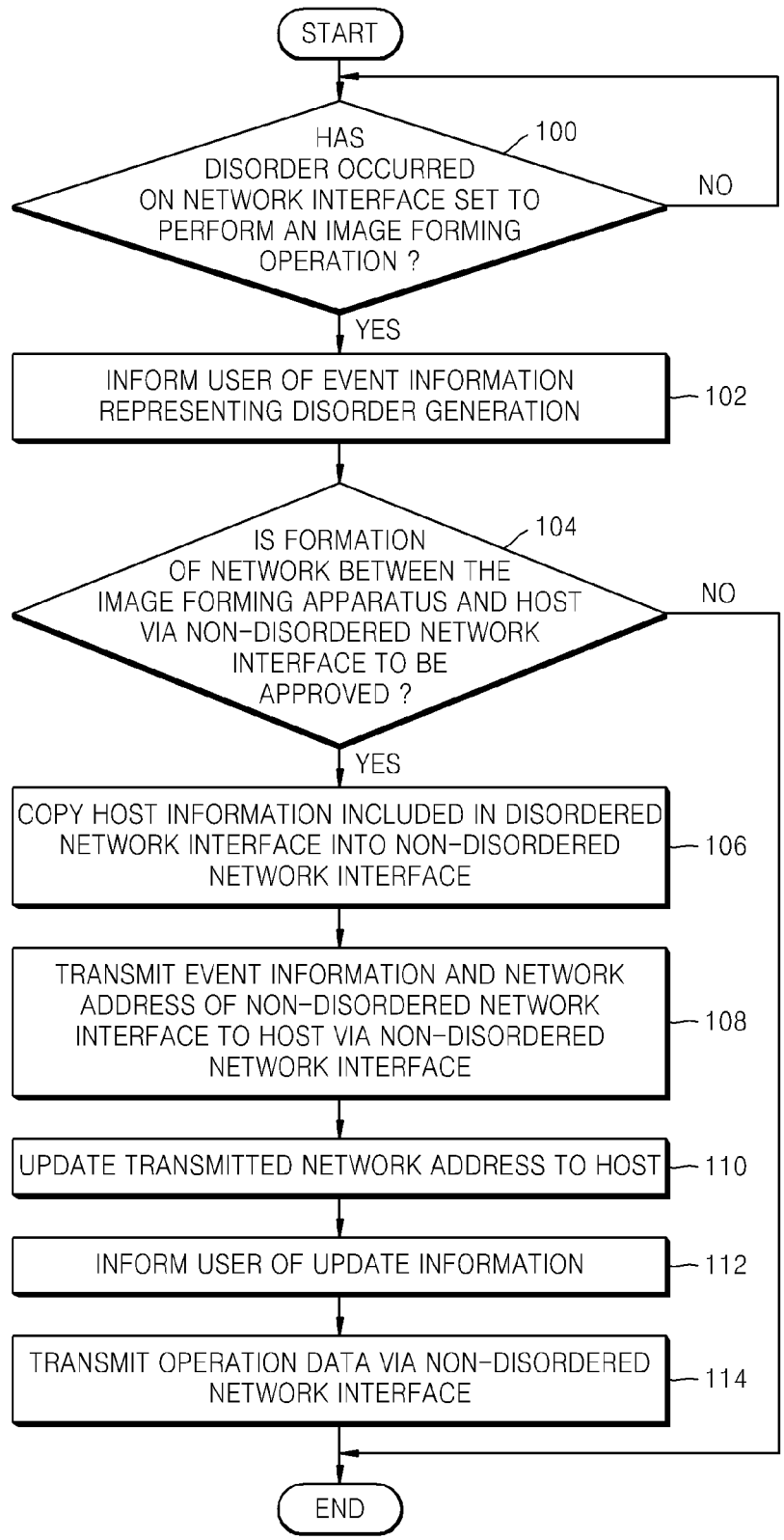
FIG. 1 is a flowchart illustrating an image forming method according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating an image forming method according to an embodiment of the present general inventive concept. Referring to FIG. 1, in operation 100, when an image forming apparatus including at least two network interfaces is connected to a host via a network, the image forming apparatus determines if a disorder has occurred on a network interface, which is one of the at least two network interfaces, set to perform an image forming operation. The disorder on the network interface denotes impossibility in communications between the host and the image forming apparatus or a physical disorder in the network interface. Here, examples of the disorder on the network interface include an exchange of IP addresses between network devices, a change in the policy of a router or firewall, an increase in network traffics, a delay of network latency, a lapse of an operation time, a collision between network addresses, etc. When the image forming operation is not performed within a certain period of time, a determination is made on generation of a disorder as an operating time lapse. The network address collision denotes a disorder caused due to the use of identical IP addresses. Generation or non-generation of such network disorders is determined by a network card (NIC) included in the image forming apparatus or the host. The image forming apparatus or the host generates a signal representing a result of the determination to be displayed on a display unit connectable to the image forming apparatus and/or the host.

Here, the image forming apparatus may have at least two IP addresses to correspond to the corresponding network interfaces. The network interfaces may be referred to as network interface units each to enable a communication line to be formed between the image forming apparatus and the host. It is possible that a single interface unit includes the at least two IP addresses to use one of the at least two IP addresses, so that the communication line can be formed between the image forming apparatus and the host. The network interfaces may be a wired or wireless interface to form a network between the image forming apparatus and the host.

In operation 102, when the disorder is generated in the set network interface, a user is informed of event information representing the disorder generation. The event information represents a fact that a disorder has been generated in the network interface of the image forming apparatus that is connected to the host. The event information is displayed on the display unit of the image forming apparatus or host.

In operation 104, it is determined whether to approve a formation of a network between the image forming apparatus and the host via a non-disordered network interface. The determination may be made by a user. Alternatively, an approval of the network formation may be set to be a default so as to be automatically made. Meanwhile, until the disorder recognized in operation 100 is solved, the approval of the network formation may not be allowed in order to maintain an original state of the network between the host and the image forming apparatus. The network formation may be a connection to be formed between the image forming apparatus and the host to communicate with each other to exchange data to perform the image forming operation.

Here, when the disorder occurred in one of the at least two network interfaces, the corresponding network interface is referred to as a disordered network interface, and the other one of the at least two network interfaces is referred to as a non-disordered network interface. Accordingly, at least one of the image forming apparatus and the host changes a communication line from the disordered network interface to the non-disordered network interface to perform the image forming operation according to the automatic or manual approval of the network formation. The disorder may happen during exchanging data usable to perform the image forming operation or until the image forming operation is completed.

When the network formation is approved in operation 104, host information is copied from the disordered network interface into the non-disordered network interface, in operation 106. The host information may be information on the host to enable connection between the host and the image forming apparatus.

In operation 108, event information representing the generation of the disorder and a network address of the non-disordered network interface are transmitted to the host. It is possible that the event information may be transmitted to the host via the non-disordered network interface. The event information and the network address of the non-disordered network interface can be transmitted to the host by using the host information copied into the non-disordered network interface.

That is, when the image forming apparatus determines the disorder and/or the interruption of the image forming operation, the image forming apparatus copies the host information from the disordered network interface to the non-disordered network interface and transmits the event information of the disorder generation and the network address of the non-disordered network interface to the host such that a new communication can be formed between the image forming apparatus and the host through the non-disordered network interface.

In operation 110, the transmitted network address is updated to the host. In response to the event information received from the image forming apparatus, the host updates the network address of the disordered network interface with the received network address of the non-disordered network interface.

In operation 112, the user is informed of the update information. The update information is displayed on the display unit of the image forming apparatus or host.

In operation 114, the image forming apparatus or the host transmits operation data to be used in the image forming operation via the non-disordered network interface. Examples of the operation data include print data, fax data, scanning data, and e-mail data. The image forming apparatus or the host processes the transmitted operation data to perform the interrupted image forming operation.

Figure 2:
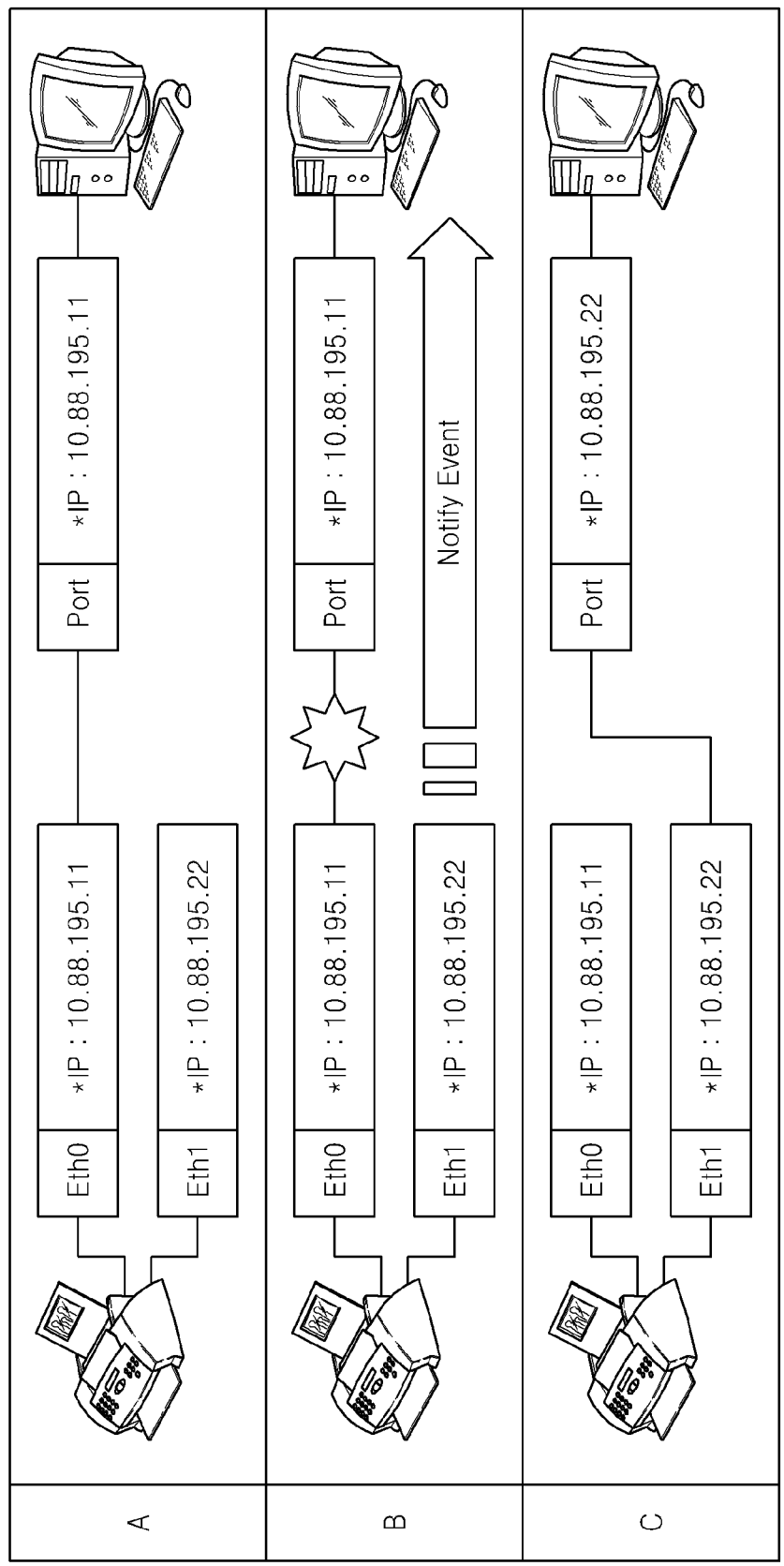
FIG. 2 is a diagram illustrating communication in an image forming system between an image forming apparatus and a host according to an embodiment of the present general inventive concept.

FIG. 2 is a diagram illustrating communication in an image forming system between the host and the image forming apparatus to perform an image forming apparatus according to an embodiment of the present general inventive concept. Referring to FIG. 2, a reference character A illustrates information about a port of the host that forms a network with a network interface Eth0 of the image forming apparatus. An IP address of the network interface Eth0 of the image forming apparatus is allocated to "10.88.195.11," and the information about the port of the host is also set to be "10.88.195.11." Another network interface Eth1 of the image forming apparatus has an IP address of "10.88.195.22." A reference character B of FIG. 2 illustrates a process in which, when a disorder occurs in the network between the network interface Eth0 of the image forming apparatus and the port of the host, the occurrence of the disorder is detected, host information used in the network interface Eth0 is copied into the non-disordered network interface Eth1, and the disorder event is transmitted to the host via the network interface Eth1. A reference character C of FIG. 2 illustrates a process to set the IP address set as the set port information is updated with the IP address of the network interface Eth1 and to transmit operation data to the network interface Eth1 via the IP address "10.88.195.22" of the updated port information. The image forming apparatus prints the received operation data in an image forming operation.

The image forming method illustrated in FIG. 1 may be implemented as computer-readable codes/instructions/operations. In other words, a computer-readable medium having recorded thereon a program is used to perform an image forming method including the operations of determining if a disorder is generated in a network set to perform an operation between an image forming apparatus including at least two network interfaces and a host, and to connect the host with the network by using a non-disordered network interface if the disorder is generated in the set network interface according to an embodiment of the present general inventive concept.

For example, the present general inventive concept can be embodied in general-use digital computers that execute the codes/instructions/programs using a computer readable recording medium. Examples of the computer readable recording medium include magnetic storage media (e.g., ROM, floppy disks, hard disks, magnetic tapes, etc.), optical recording media (e.g., CD-ROMs, or DVDs), and storage media such as carrier waves (e.g., transmission through the Internet). Embodiments of the present general inventive concept are implemented as media that include computer readable codes. Network coupled computer systems are distributed so that the embodiments are executed in a distributed fashion. Also, functional programs, codes, and code segments for accomplishing the present general inventive concept can be easily construed by programmers skilled in the art to which the present general inventive concept pertains.

An image forming apparatus and a host according to the present general inventive concept will now be described in detail with reference to the accompanying drawings.

Figure 3:
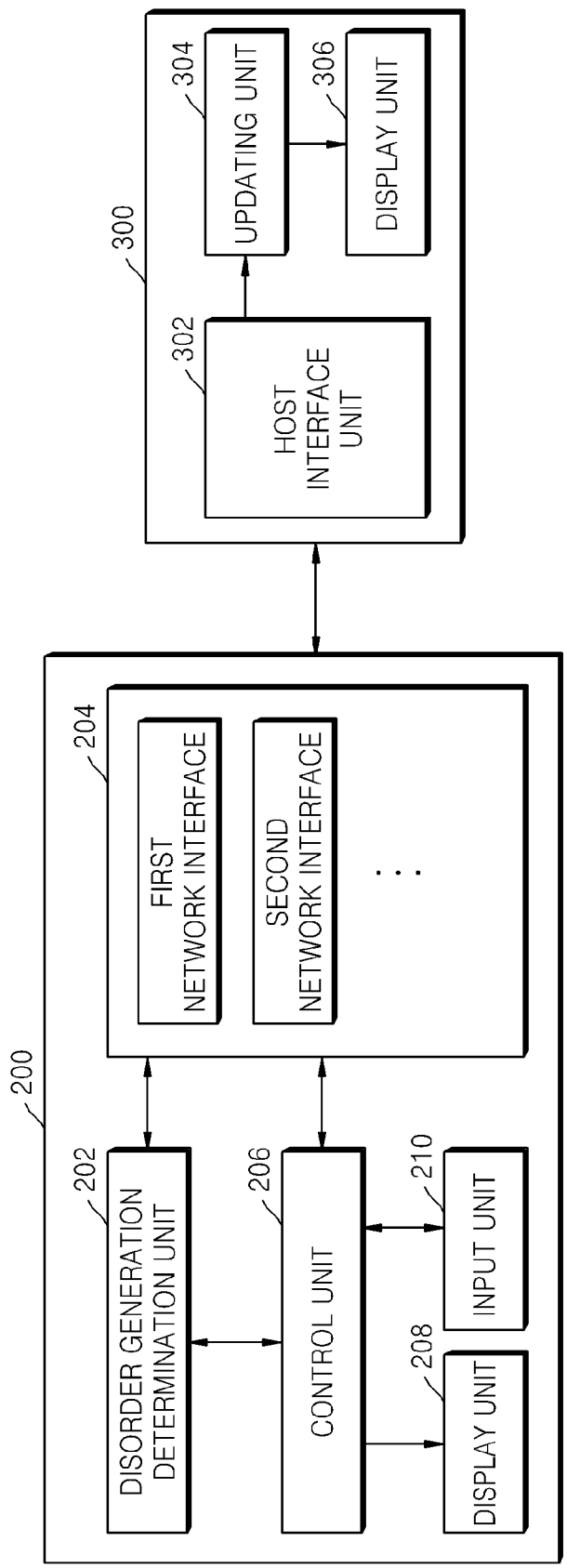
FIG. 3 is a block diagram illustrating an image forming system including an image forming apparatus and a host according to an embodiment of the present general inventive concept.

FIG. 3 is a block diagram illustrating an image forming apparatus 200 and a host 300 as an image forming system according to an embodiment of the present general inventive concept. Referring to FIG. 3, the image forming apparatus 200 includes a disorder generation determination unit 202, a plurality of network interfaces 204, a control unit 206, a display unit 208, and an input unit 210.

The image forming apparatus 200 may further include a printing unit to perform an image forming operation of feeding a print medium, forming or printing an image on the print medium, and discharging the print medium. A conventional printing can be used as the printing unit of the image forming apparatus 200.

The disorder generation determination unit 202 determines if a disorder is generated in a network interface set to perform an operation from among the network interfaces 204, and outputs the result of the determination to the control unit 206. The disorder generation determination unit 202 determines impossibility in communications between the host 300 and the image forming apparatus 200 or generation of a physical disorder in the network interfaces 204. More specifically, the disorder generation determination unit 202 determines as network disorders an exchange of IP addresses between network devices, a change in the policy of a router or firewall, an increase in network traffics, a delay of network latency, a lapse of an operation time, a collision between network addresses, etc. Although it is illustrated in the embodiment of FIG. 3 that the image forming apparatus 200 determines generation or non-generation of a network disorder, the present general inventive concept is not limited thereto. In other words, the host 300 may determine generation or non-generation of a network disorder.

It is also possible to determine a malfunction of the network interface as the disorder of the network interface. The malfunction of the network interface may include interruption of the image forming operation or inability to receive data from the host 300 to perform the image forming apparatus.

According to the result of the determination performed by the disorder generation determination unit 202, the control unit 206 copies host information included in a disordered network interface into a non-disordered network interface and transmits event information representing generation of a disorder and a network address of the non-disordered network interface to the host 300 via the non-disordered network interface. The host information may be information about a port of the host 300. More specifically, the event information represents generation of a disorder in a network formed between the image forming apparatus 200 and the host 300. The control unit 206 transmits the event information and the network address of the non-disordered network interface to the host 300 by using the host information copied into the non-disordered network interface.

The display unit 208 displays the event information representing generation of a network disorder. The display unit 208 also displays information with which the host 300 has been updated.

The input unit 210 receives a selection of a user regarding whether to approve a change in the network between the host 300 and the image forming apparatus 200. The control unit 206 receives the user's selection from the input unit 210 and controls the network change as described above.

The host 300 receives the network address of the non-disordered network interface via the non-disordered network interface and updates an address for forming a network with the image forming apparatus 200 with the received network address. To achieve this, the host 300 includes a host interface unit 302, an updating unit 304, and a display unit 306.

The host interface unit 302 receives the network address of the non-disordered network interface via the non-disordered network interface.

The updating unit 304 updates the address for forming the network with the image forming apparatus 300 with the received network address.

The display unit 306 displays update of the updating unit 304 so that the user can check the update.

The host interface unit 302 transmits work data via the updated network interface.

In the present invention, when a network disorder is generated in an environment including a plurality of network interfaces, an image forming operation can continue by using a network interface not affected by the network disorder. This leads to fast image formation. In addition, even when a user does not change the original connection of the disordered network interface to perform the operation, the original connection is automatically changed to a connection of the host to the non-disordered network interface. Therefore, inconvenience of the user is prevented.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of an image forming system, the method comprising:
   determining if a disorder is generated in a network set to perform an operation among networks between a host and an image forming apparatus including at least two network interfaces;
   if the disorder is generated in the set network, copying a host information of the host included in a disordered network interface of the image forming apparatus into a non-disordered network interface of the image forming apparatus; and
   transmitting event information representing generation of the disorder and a network address of the non-disordered network interface to the host via the non-disordered network interface by using the copied host information to update the host with the transmitted network address.

2. The method of claim 1, wherein the disorder is one of an exchange in network addresses, a change of firewall setting, an increase in network traffics, an operation time lapse, and a collision between network addresses.

3. The method of claim 1, wherein the determination of generation or non-generation of the disorder in the set network is performed in a network card included in one of the host and the image forming apparatus, and a result of the determination is displayed on one of the host and the image forming apparatus.

4. The method of claim 1, wherein the networking of the image forming apparatus with the host via the non-disordered network interface further comprises:
   informing a user of one of the event information and the update information.

5. The method of claim 4, wherein the event information and the update information are displayed on a display unit of the host and a display unit of the image forming apparatus.

6. The method of claim 1, further comprising:
   if a disorder is generated in the set network, determining whether to network the image forming apparatus with the host via the non-disordered network interface.

7. The method of claim 6, wherein the determination as to whether to network the image forming apparatus with the host is made by a user.

8. The method of claim 6, wherein in the determining whether to network the image forming apparatus with the host via the non-disordered network interface, when the disorder is automatically removed, the original networking of the image forming apparatus with the host is maintained.

9. The method of claim 1, further comprising:
   transmitting operation data via the non-disordered network interface.

10. The method of claim 9, wherein the operation data is one of print data, fax data, scanning data, and e-mail data.

11. A computer-readable recording medium having recorded thereon a program to execute a network image forming method of an image forming system, the method comprising:
    determining if a disorder is generated in a network set to perform an operation among networks between an image forming apparatus including at least two network interfaces and a host;
    if the disorder is generated in the set network, copying a host information of the host included in a disordered network interface to a non-disordered network interface of the image forming apparatus; and
    transmitting event information representing generation of the disorder and a network address of the non-disordered network interface to the host via the non-disordered network interface by using the copied host information to update the host with the transmitted network address.

12. An image forming apparatus comprising:
    a plurality of network interfaces to be networked with a host;
    a disorder generation determining unit to determine if a disorder is generated in a network interface set to perform an operation among the network interfaces; and
    a control unit to control the image forming apparatus to be networked with the host via a non-disordered network interface of the image forming apparatus according to a result of the determination performed by the disorder generation determining unit,
    wherein the control unit copies a host information of the host included in a disordered network interface into the non-disordered network interface and transmits event information representing generation of the disorder and a network address of the non-disordered network interface to the host via the non-disordered network interface by using the copied host information.

13. The apparatus of claim 12, wherein the disorder generation determining unit determines as the disorder an exchange in network addresses, a change of firewall setting, an increase in network traffics, an operation time lapse, and a collision between network addresses.

14. The apparatus of claim 12, wherein operation data is exchanged with the host via the non-disordered network interface.

15. The apparatus of claim 14, wherein the operation data is one of print data, fax data, scanning data, and e-mail data.

16. The apparatus of claim 12, further comprising a display unit displaying the event information.

17. A host that forms a network with an image forming apparatus comprising at least two network interfaces, the host comprising:
    a host interface to receive a network address of a non-disordered network interface of the image forming apparatus via a non-disordered network interface; and
    an updating unit to update an address for networking with the image forming apparatus with the received network address,
    wherein a host information of the host is copied to the non-disordered network interface from the disordered network interface, and the network address of the non-disordered network interface is transmitted to the host via the non-disordered network interface by using the copied host information.

18. The host of claim 17, further comprising:
    a display unit displaying update information used in the updating unit.

19. An image forming apparatus usable with a host, comprising:
    a plurality of network interfaces to connect the image forming apparatus to the host; and
    a controller to detect a disorder of a first network interface of the image forming apparatus through which the image forming apparatus and the host are networked and to reroute the networked image forming apparatus and the host via a second network interface of the image forming apparatus, if the disorder is detected in the first network interface,
    wherein the controller copies a host information of the host included in the first network interface to the second network interface and transmits event information regarding the disorder and a network address of the second network interface to the host via the second network interface by using the copied host information, if the disorder is detected in the first network interface.

20. The image forming apparatus of claim 19, wherein the disorder is at least one of an exchange in network addresses, a change of a firewall setting, an increase in network traffic, an operation time lapse, and a collision between network addresses.

21. The image forming apparatus of claim 12, wherein the plurality of network interfaces includes at least one wired network interface and at least one wireless network interface.

22. The image forming apparatus of claim 12, wherein the plurality of network interfaces includes at least two wireless network interfaces.

* * * * *